United States Patent [19]

Yannaccone

[11] Patent Number: 5,872,321

[45] Date of Patent: Feb. 16, 1999

[54] SIDE IMPACT INJURY TEST APPARATUS

[75] Inventor: John R. Yannaccone, Perkasie, Pa.

[73] Assignee: The United States of America as represented by the Secretary of the Navy, Washington, D.C.

[21] Appl. No.: 986,547

[22] Filed: Dec. 8, 1997

[51] Int. Cl.[6] ............................ G01M 7/08; G01M 19/00
[52] U.S. Cl. ..................... 73/865.3; 73/865.6; 73/12.04
[58] Field of Search ............................... 73/865.3, 865.6, 73/865.8, 12.04

[56] References Cited

U.S. PATENT DOCUMENTS

| | | | |
|---|---|---|---|
| 3,329,024 | 7/1967 | Cumpston, Jr. ......................... | 73/865.3 |
| 5,189,920 | 3/1993 | Martinez ................................ | 73/865.3 |
| 5,373,749 | 12/1994 | Strand et al. ........................... | 73/865.3 |
| 5,483,845 | 1/1996 | Stein et al. ............................. | 73/865.3 |
| 5,485,758 | 1/1996 | Brown et al. .......................... | 73/865.3 |
| 5,641,917 | 6/1997 | Hurite et al. .......................... | 73/865.3 |

*Primary Examiner*—Max H. Noori
*Attorney, Agent, or Firm*—Ron Billi

[57] ABSTRACT

An apparatus for conducting impact events for use in conjunction with a horizontal accelerator includes a base having tracks attached to the top thereof; a seat slidably attached to the tracks, the seat capable of moving independently of the base and along the tracks, the seat for positioning a test dummy before and during an impact event; a barrier positioned and arranged adjacent one end of the base for impacting the test dummy, the barrier having load cells for generating signals in response to the impact between the test dummy and the barrier; an attenuator for impacting the seat and accelerating the seat up to the velocity of the base when the base is accelerated by the horizontal accelerator; and an anti-reverse mechanism for retaining the seat after the seat is accelerated up to the velocity of the horizontal accelerator. In operation, a test dummy is positioned on the seat and secured, if desired. The seat is slidably positioned on the base the desired distance from the barrier. The horizontal accelerator is fired, in accordance with a predetermined acceleration profile. As the base accelerates, the seat contacts the attenuator wherein the dummy begins to slide off the seat and impact the barrier. The load cells in the barrier generate signals in response to the impact. After the seat contacts the attenuator, the anti-reverse mechanism retains the seat adjacent the barrier.

10 Claims, 6 Drawing Sheets

SIDE IMPACT INJURY TEST APPARATUS

STATEMENT OF GOVERNMENT INTEREST

The invention described herein may be manufactured and used by or for the Government of the United States of America for government purposes without the payment of any royalties thereon and therefor.

BACKGROUND OF THE INVENTION

The present invention relates to impact test devices for measuring and evaluating laboratory collision events that attempt to simulate, for example, automobile or airplane crashes. More specifically, but without limitation, the present invention relates to a test apparatus for simulating side impact crashes for use in conjunction with a horizontal accelerator that provides a desired initial velocity component.

It is often desirable to study and evaluate the effects of automobile, airplane and other crashes that cause damage and injury due to impact and rapid deceleration. Such study and evaluation is oftentimes conducted in laboratories wherein a crash event is simulated under controlled conditions. Various methods and devices have been utilized by those skilled in the art to conduct a simulated crash event.

One common test involves impacting a target vehicle in the side with either another vehicle or a movable barrier as required by the Federal Motor Vehicle Safety Specification 214. Although useful and successful, this testing method requires a large test area and is expensive due to the damage and/or destruction of the test vehicles. In addition, the setup for conducting such a test is complex, thus making setup and repeatability difficult. The lack of repeatability makes conducting comparative testing under identical test conditions impossible. As a result, the validity and acceptance of the test results is brought into question by the scientific community. The high associated costs and complex setup also makes conducting a large number of tests prohibitive.

Another test involves a decelerative sled which impacts a deformable material to provide a desired acceleration profile. This method causes difficulty in maintaining the initial position of the test dummy while the test dummy is accelerated up to the final impact velocity.

There is thus a need in the art to provide an apparatus that may be used to simulate collision events, such as side impact collision events and the like, that may be used in a small area. There is also a need to provide an apparatus that will carry out such impact events yet minimize destruction of or severe damage to the test equipment and associated test pieces. There is also a need to provide an apparatus that will produce repeatable results that will be acceptable to the scientific community.

It is therefore an object of the present invention to provide an apparatus that will produce reliable, repeatable results.

It is another object of the present invention to provide an apparatus that can be operated in a relatively small area.

It is a further object of the present invention to provide an apparatus that will carry out impact tests yet minimize or eliminate destruction or damage to the test equipment and associated test pieces.

SUMMARY OF THE INVENTION

Accordingly, the preferred embodiment of the present invention provides an apparatus for conducting collision tests, especially of side impacts, that does not destroy or damage the test apparatus or equipment yet produces reliable and repeatable test inputs (i.e. parameters) and allows the testing events to be conducted in a relatively small test area. The test apparatus is for use in conjunction with a horizontal accelerator and includes a base attached to the horizontal accelerator; a slidable seat; a track attached to the base for guiding the movement of the slidable seat from one end of the base to the other end of the base; a barrier attached to one end of the base for impacting a test dummy located on the seat and for generating a signal in response to the impact; an attenuator located on the base and positioned and arranged to contact the seat when the seat is adjacent the barrier, the attenuator for accelerating the seat up to the velocity of the base and to prevent the seat from impacting the barrier with excessive force; and anti-reverse means for retaining the seat adjacent the barrier after the seat is accelerated up to the velocity of the base.

In operation, a test dummy, or other payload, is fastened as desired to the slidable seat. The seat is then positioned along the track adjacent the end of the base opposite the barrier or as desired to simulate a particular crash scenario. The horizontal accelerator, with the test apparatus attached thereto, is then fired in accordance with a predetermined acceleration profile thereby accelerating the base up to a desired velocity, for example, 35 miles per hour. The slidable seat and payload remain stationary due to the slidable characteristics (i.e. low friction and inertia effects) of the seat on the tracks. The base continues to move relative to the seat until the seat contacts the attenuator adjacent to the barrier and is accelerated up to the speed of the base. As the seat is being accelerated, the test dummy begins to slide across the seat and contacts the barrier thereby simulating the desired impact event. Load cells located in the barrier generate signals in response to the impact event which are recorded by instrumentation hard wired or otherwise connected to the load cells. After the seat accelerates up to the velocity of the base, the anti-reverse mechanism retains the seat means adjacent the barrier as the horizontal accelerator slows to a stop.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
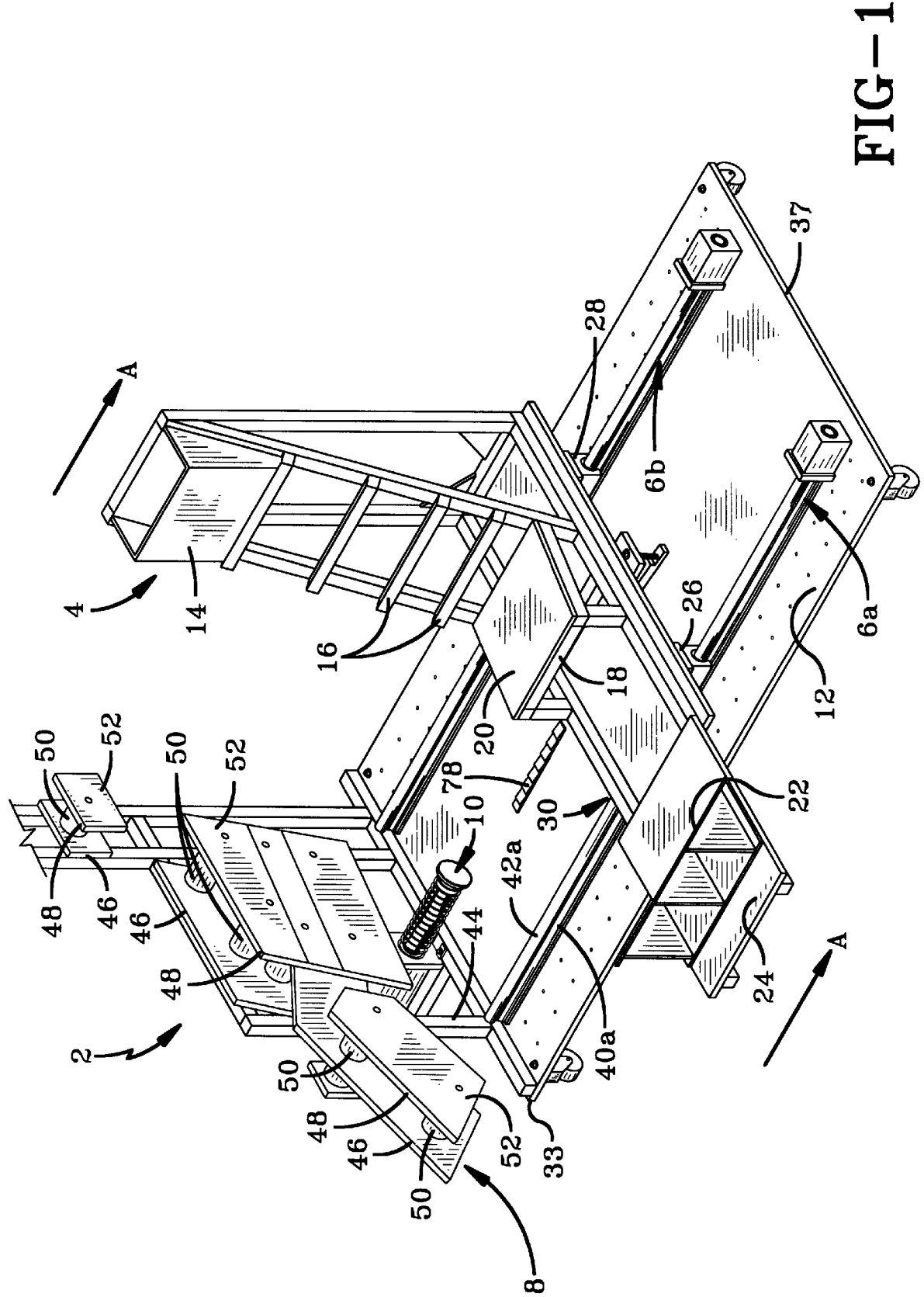
FIG. 1 is a side view of present invention.
Figure 2:
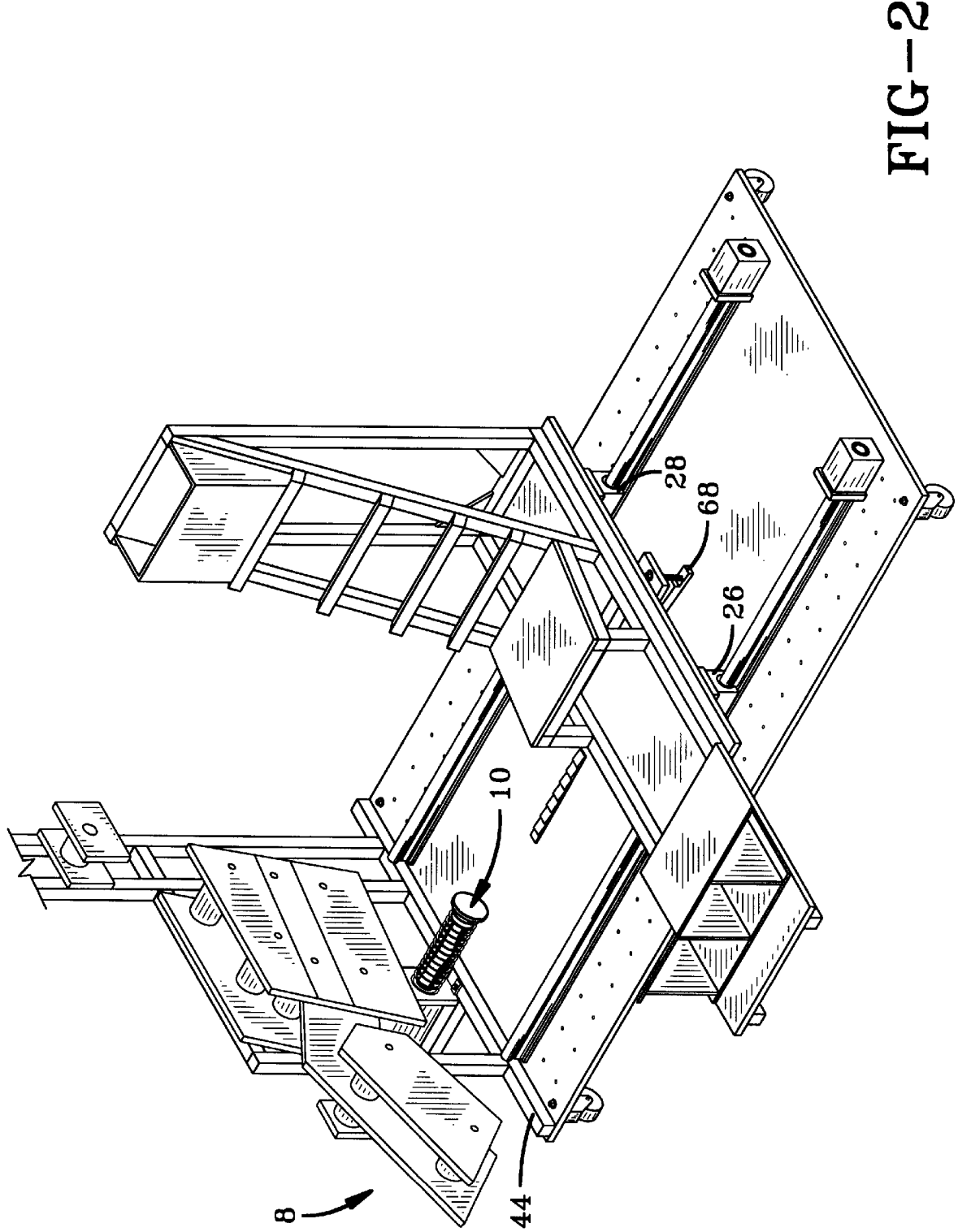
FIG. 2 is a end view of the present invention showing the seat assembly located in a typical start position.
Figure 3:
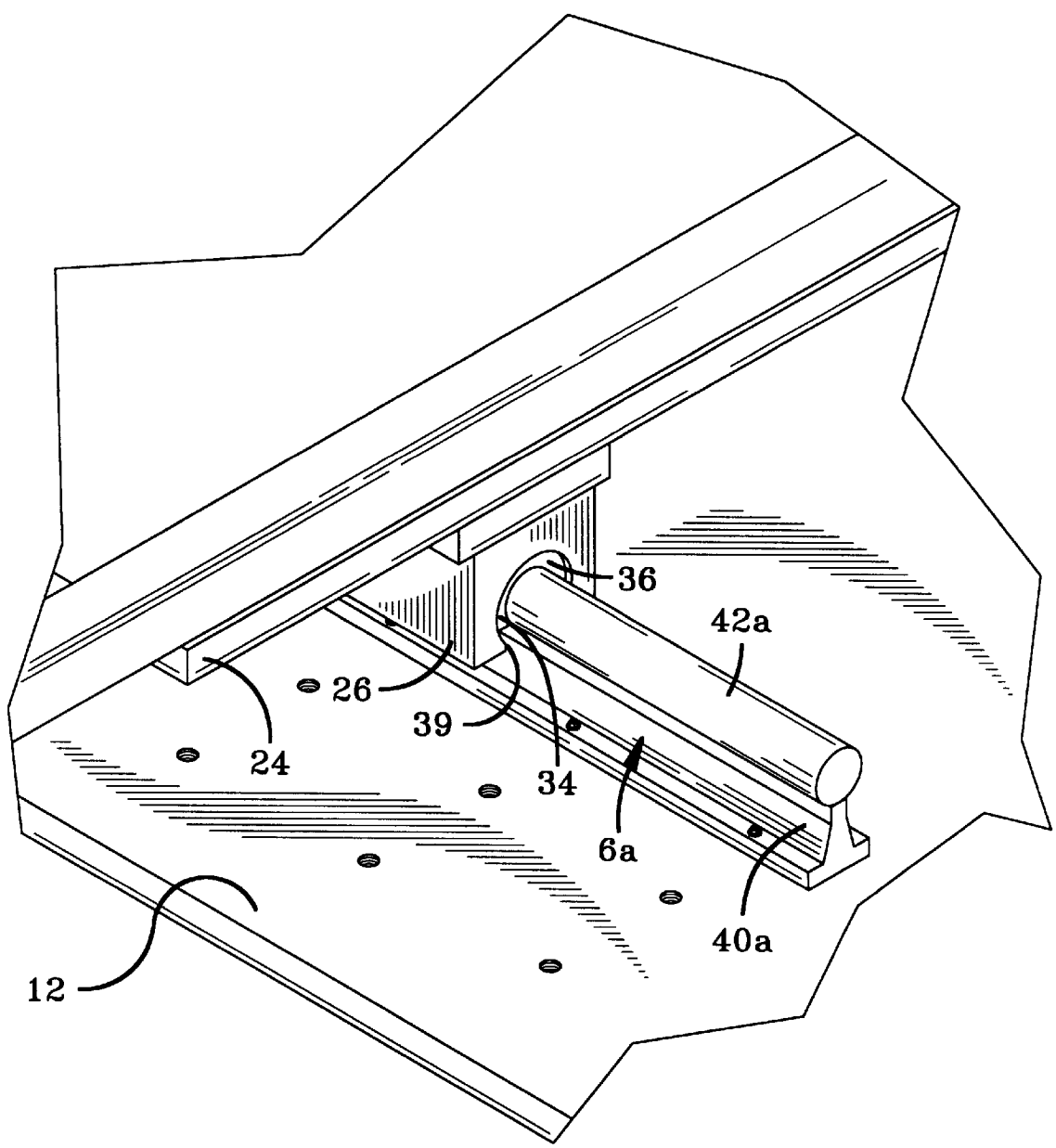
FIG. 3 is a view showing an open pillow block attached to the base and communicating with the guide rails.
Figure 4:
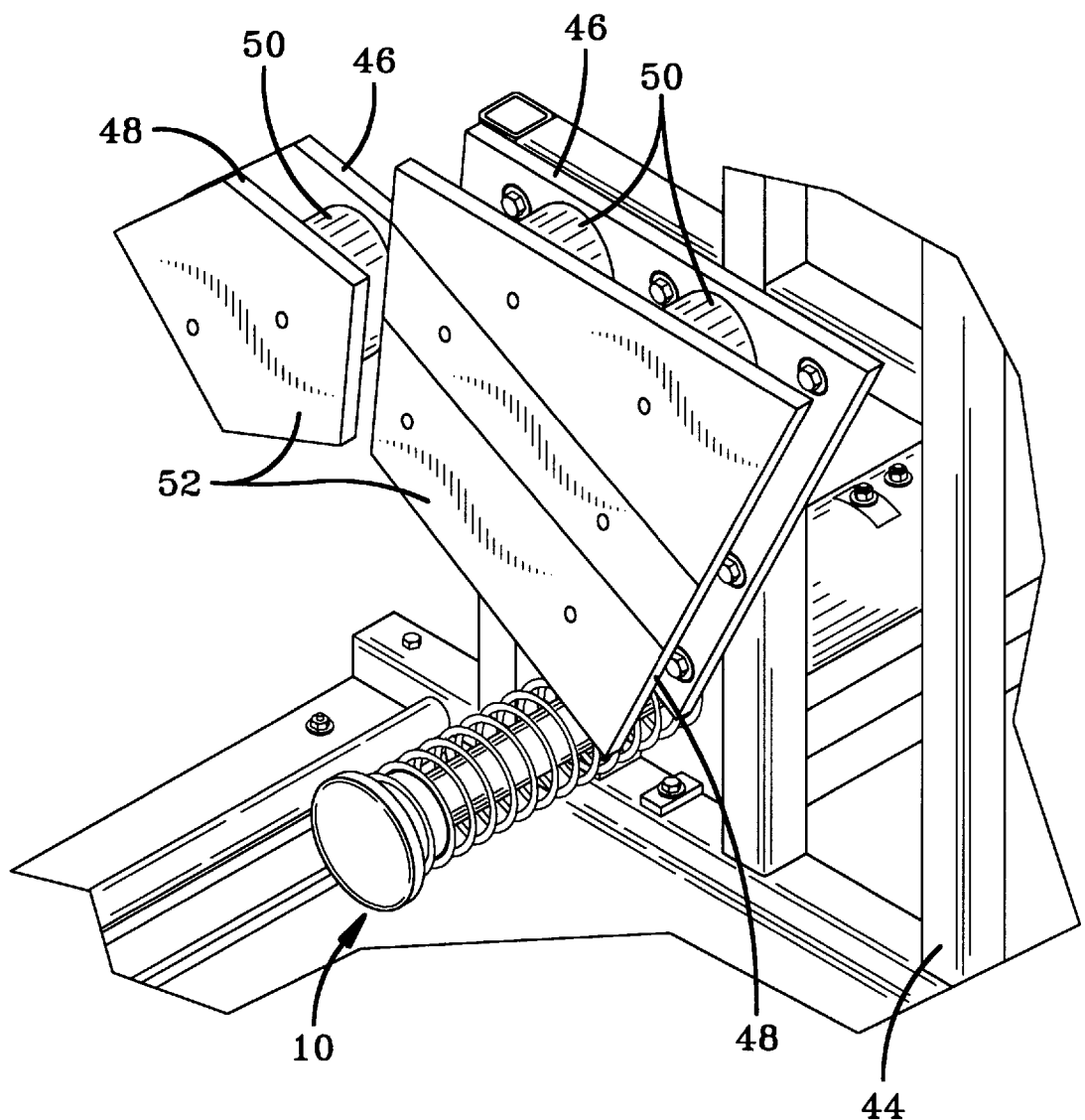
FIG. 4 is a view showing the barrier with load cells attached to the frame and the energy attenuator attached to the base.

The preferred embodiment of the present invention is illustrated by way of example in FIGS. 1–6. As shown in FIG. 1, side impact injury test apparatus 2 includes seat assembly 4, tracks 6a and 6b, barrier 8, energy attenuator 10 and base 12. Seat assembly 4 includes adjustable headrest 14, adjustable back support 16, support 18, adjustable footrest 22, and carriage 24, all fabricated, for example, from mild steel SAE 1020 and attached as by welding. Seat assembly 4 also includes seat bottom 20, rigidly attached to support 18, for example, by screw means and fabricated from a low coefficient of friction material, such as Teflon. Open pillow blocks 26 and 28 are attached to the bottom of carriage 24 on one side of carriage 24 (see FIG. 2) and open pillow blocks 30 and 32 are attached to the bottom of carriage 24 on the other side of carriage 24. Each open pillow block includes a bore 34 having a linear bearing 36 located therein (see FIG. 3). Each bore 34 includes a slot 39 for providing clearance for the end of the pillow block adjacent support 40a or 40b. In the preferred embodiment, base 12 is approximately 8 feet long and 4 feet wide and is attached to a horizontal accelerator (not shown). A suitable and preferred horizontal accelerator has characteristics to provide acceleration pulses up to 50 G's and 70 M.P.H. The acceleration pulse characteristics include a rapid onset (i.e. load application) and a short (i.e. less than 200 millisecond) duration. Other horizontal accelerators may be substituted by those skilled in the art to obtain other desirable characteristics. Tracks 6a and 6b are attached to the top of base 12 and are positioned and arranged in a parallel fashion approximately 33 inches apart. Tracks 6a and 6b are approximately 8 feet long. Track 6a includes support 40a and rail 42a. Support 40a has a "T" x-section and rail 42a is attached thereto at both ends. Track 6b includes support 40b and rail 42b. Support 40b has a "T" x-section and rail 42b is attached thereto at both ends. Note that rails 42a and 42b are spaced apart from supports 40a and 40b respectively to provide clearance for linear bearings 36. Slots 39 also provide clearance in the pillow blocks for supports 40a and 40b. As shown in FIG. 3, support 40b is attached to the top of base 12 in an "inverted" fashion (i.e. the "T" is upside down). Support 40a is similarly attached to base 12. Rails 42a and 42b are selected to have a diameter providing a slip fit in linear bearing 36. The linear bearings of open pillow blocks 26 and 30 are attached to and slide along rail 42a and the linear bearings of open pillow blocks 28 and 32 are attached to and slide along rail 42b. It can thus be seen that carriage 24, with seat assembly 4 attached thereto, may slide along rails 42a and 42b from one side of base 12 adjacent barrier 8, to the other side of base 12 opposite barrier 8. The present invention may also be operated with a single track or more than two tracks.

As shown in FIGS. 1–4, barrier 8 is attached to one end of base 12 and includes tubular frame 44, one or more inner plates 46, one or more outer plates 48 and one or more load cells 50. Load cell(s) 50 are located between inner plate(s) 46 and outer plate(s) 48 with inner plate(s) 46 attached to frame 44. In the preferred embodiment, barrier 8 is positioned and arranged so that face 52 is perpendicular to the axis of tracks 6a and 6b. Barrier 8 may be otherwise positioned as desired to simulate, for example, impacts with a non-zero angle of force. In addition, barrier 8 may be replaced by other impact surfaces, such as an automobile or helicopter door.

Figure 5:
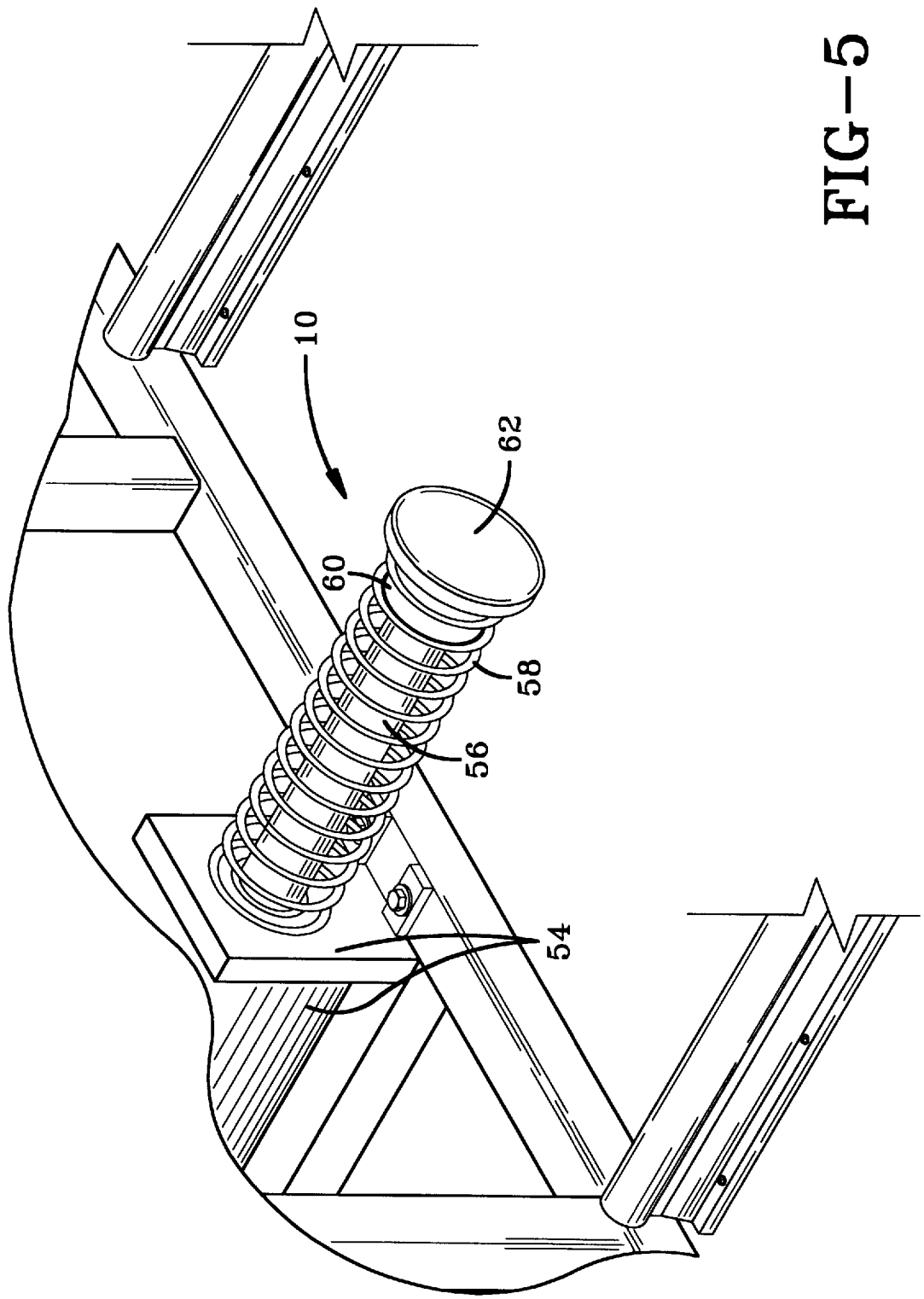
FIG. 5 is a view showing the energy attenuator.

Energy attenuator 10 is attached to base 12 and includes hydraulic damper 54, shaft 56, return spring 58 and rod end plate 60 (see FIGS. 1 and 5). Rod end plate 60 is rigidly attached to shaft 56. Return spring 58 is positioned between damper 54 and rod end plate 60 and is preloaded thereby maintaining shaft 56 in the normally extended position, as shown in FIGS. 1, 2, 4 and 5. A force is required to both compress return spring 58 and overcome the hydraulic resistance of damper 54 thereby compressing shaft 56 into damper 54. Note, that in the normally extended position, rod end plate 60 extends into the interior of base 12. Attenuator 10 is located adjacent base 12 and is positioned and arranged so that face 62 of rod end plate 60 initially abuts carriage 24 when seat assembly 4 is approximately 8 inches from barrier 8. The axis of shaft 56 is approximately parallel to the axis of rails 42a and 42b. In the preferred embodiment, attenuator 10 is sized to effect an acceleration of approximately 50 G's on carriage 24 but may be adjusted to higher or lower values as desired. Carriage 24 is thus accelerated to the velocity of the horizontal accelerator over a distance of approximately 8 inches.

Figure 6:
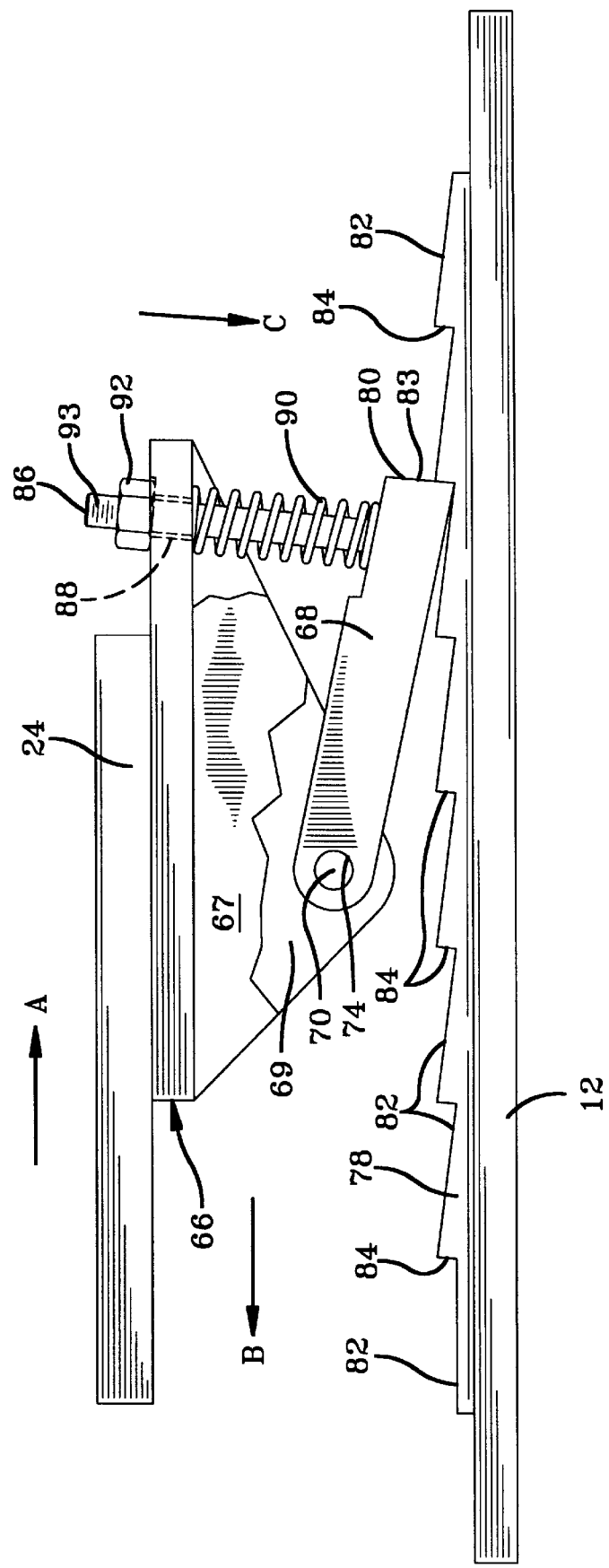
FIG. 6 is a view showing the anti-reverse mechanism.

Anti-reverse mechanism 64 is shown in FIGS. 1, 2 and 6. As shown in FIG. 6, pawl bracket 66 is attached to and depends from carriage 24. Pawl bracket 66 includes parallel flanges 67 and 69. Note that a portion of flange 67 is cut away in FIG. 6 for clarity. Pawl 68 is located between flanges 67 and 69 and is pivotally attached to flanges 67 and 69 via pin 70 inserted in aligned bores 72 (not shown), 74 and 76 (not shown). Note that bore 72 is located in flange 67 and bore 76 is located in flange 69. Sprag plate 78, attached to base 12, is a generally elongate fixture having one or more notches 82 located along its length, each notch fashioned to engage end 80 when end 80 is positioned over notch 82 and pawl 68 is extended downwardly in the direction of arrow "C". When seat assembly 4 then moves in the direction of arrow "A", face 83 abuts face 84 thus preventing additional movement of seat assembly 4 in the direction of arrow "A". Shaft 86 communicates with bore 88 and one end of shaft 86 is attached to pawl 68. Spring 90 is located around shaft 86 and nut 92 is attached to shaft 86 via threads 93. It can thus be seen that pawl 68 may rotate upwardly against the force of spring 90 when carriage 24 is moved in the direction of arrow B and pawl 68 contacts notches 82 of sprag plate 78. Pawl 68 may also be rotatably positioned about pin 70 by moving nut 92 on shaft 86 disengaging, for example, end 80 from notch 82. Seat assembly 4 may then be moved in the direction of arrow A free from engagement with notches 82.

It can thus be seen that seat assembly 4 may slide on rails 42a and 42b from one side of base 12 to the other side of base 12 by means of linear bearings 36.

In operation, base 12 is attached to a horizontal accelerator (not shown) and a test dummy is positioned on seat assembly 4. The feet of the dummy abut footrest 22, the buttocks of the dummy abut seat bottom 20, the back of the dummy abuts back support 16 and the head of the dummy abuts headrest 14. A belt or other restraining means may be used to secure and retain the dummy in position before, during and/or after a test, if desired. Carriage 24 (and seat assembly 4) is positioned adjacent end 37 (i.e. opposite end 33 and barrier 8). The horizontal accelerator is then fired in accordance with a predetermined acceleration profile to cause base 12 to accelerate to the desired predetermined terminal velocity in a direction parallel to rails 42a and 42b and towards seat assembly 4. This direction is indicated as arrow "A" in FIG. 1. It should be noted that as base 12 is being accelerated to terminal velocity, seat assembly 4 remains approximately stationary since base 12 may move relative to seat assembly 4 via linear bearings 36. The desired terminal velocity is obtained prior to energy attenuator 10 contacting seat assembly 4. As energy attenuator 10 first contacts seat assembly 4, the velocities of seat assembly 4 and base 12 begin to close, that is, seat assembly 4 begins to accelerate up to the velocity of base 12 due to the energy absorption characteristics of return spring 58 and damper 54. If no restraining means is utilized to retain the dummy on seat assembly 4, the dummy simultaneously begins to slide on seat bottom 20, relatively unaffected by the change in velocity of the seat due to the low coefficient of friction of seat bottom 20. The dummy continues to slide off seat assembly 4 until contacting barrier 8 thus simulating the desired impact event. Upon impact, load cells 50 produce signals which represent the impact event and such signals are recorded by means (not shown) electrically connected to load cells 50, for example, by hard wiring. Following initial impact, seat assembly 4 continues to accelerate until its velocity equals the velocity of base 12 and return spring 58 and damper 54 have fully absorbed the impact. Brakes (not shown) are now applied to stop the horizontal accelerator, base 12 and seat assembly 4 which continue to have a velocity in the direction of arrow "A". Anti-reverse mechanism 64 automatically engages to retain seat assembly 4 adjacent barrier 8. In the preferred embodiment, the entire test event, from firing the horizontal accelerator to bringing the horizontal accelerator back to zero velocity, occurs in approximately one second.

Obviously, many modifications and variations of the present invention are possible in light of the above teachings. It is therefore to be understood that within the scope of the appended claims, the invention may be practiced otherwise than as specifically described.

What is claimed is:

1. An apparatus for conducting collision events, the apparatus for use in conjunction with an acceleration device, comprising:

a base having a first end and a second end, the base attached to the acceleration device;

track means attached to said base and extending from the first end of said base to the second end of said base;

seat means slidably communicating with the track means for positioning a test dummy prior to and during an impact event, the seat means capable of moving along said track means;

barrier means located adjacent said first end of said base for impacting the test dummy located on said seat means when said seat means is adjacent said first end of said base, said barrier means also for generating one or more signals in response to said test dummy impacting said barrier means;

attenuator means located adjacent said first end and positioned and arranged to impact said seat means when said seat means is adjacent said first end, the attenuator means causing said seat means to be accelerated up to the velocity of said base when said acceleration device is fired to accelerate said base;

anti reverse means for retaining said seat means adjacent said barrier means after said seat means is accelerated up to the velocity of said base.

2. An apparatus for conducting simulated crash events comprising:

a seat;

track means;

an attenuator;

a base;

barrier means;

wherein the seat, the track means, the attenuator, the barrier means and the base communicate with an accelerator and with each other to cause said seat to move along said track means and be accelerated up to the velocity of said accelerator and said barrier means after said accelerator is fired and after said accelerator and said barrier means have attained a predetermined terminal velocity and after said seat has contacted said attenuator.

3. The apparatus defined in claim 2, further including anti-reverse means for retaining said seat adjacent said attenuator after said seat contacts said attenuator.

4. The apparatus defined in claim 2, further including a barrier positioned and arranged to contact a test dummy located on said seat after said seat initially contacts said attenuator, the barrier having means for generating a signal in response to said test dummy contacting said barrier.

5. The apparatus defined in claim 4, further including anti-reverse means for retaining said seat adjacent said attenuator after said seat contacts said attenuator.

6. The apparatus defined in claim 5, wherein said track means includes two tracks positioned and arranged in a parallel fashion.

7. The apparatus defined in claim 6, wherein the tracks each include a support and a rail.

8. The apparatus defined in claim 7, wherein said attenuator includes a hydraulic damper, a shaft, a return spring and a rod end plate.

9. The apparatus defined in claim 5, wherein said track means includes a support and a rail.

10. The apparatus defined in claim 9, wherein said attenuator includes a hydraulic damper, a shaft, a return spring and a rod end plate.

* * * * *